United States Patent Office 3,737,467
Patented June 5, 1973

3,737,467
PREPARATION OF ALLYLIC TERPENIC ALCOHOLS
William D. Fordham, 149 Kingwood Chase, Leigh-on-Sea, Essex, England, and Hifzur R. Ansari, 36 Wilmot Road, London, England
No Drawing. Filed Apr. 30, 1969, Ser. No. 820,640
Claims priority, application Great Britain, May 17, 1968, 23,646/68
Int. Cl. C07c 33/02, 35/02
U.S. Cl. 260—631.5
15 Claims

ABSTRACT OF THE DISCLOSURE $C_{10}$ allylic terpenic halides are solvolysed in good yield to the corresponding alcohols in a one-step process comprising aqueous solvolysis in the presence of a liquid organic compound, preferably acetone, in which the terpenic halide and water are both separately mixable and using a cuprous halide catalyst. The reaction is preferably conducted at from —20° C. to +30° C. and at a pH 7.5 to 9.0.

---

This invention relates to the preparation of allylic terpenic alcohols, by which is meant alcohols having an essential ten carbon atom monoterpenoid structure and in which an alcoholic group is conjugated with an ethylenic linkage in an allylic system of fragmental structure

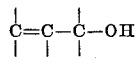

These allylic terpenic alcohols are produced according to the invention by the direct solvolysis of allylic terpenic halides with water. Hitherto it has been customary to carry out the conversion of such halides to the alcohols by a two-stage reaction in which the halides are first converted to a lower carboxylate ester such as the acetate and this ester has then been saponified to produce the alcohol. This two-stage reaction is in principle uneconomic compared with the direct reaction of water as solvolytic medium as regards both materials and operating costs.

The reactions of the allylic terpenic halides are also often complicated by the tendency of the allylic terpenic systems to undergo various isomerisation reactions. Firstly, the system undergoes allylic transformation reactions according to the fragmental formulae:

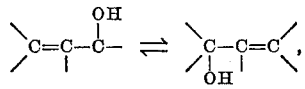

and secondly the terpenic structure may itself undergo more fundamental rearrangement. For example when myrcene (I) is reacted with 1 mole of hydrogen chloride there is produced the so-called myrcene hydrochloride. This is a mixture of myrcenyl chloride (II), linalyl chloride (III) and geranyl chloride (together with its geometric isomer, neryl chloride) (IV).

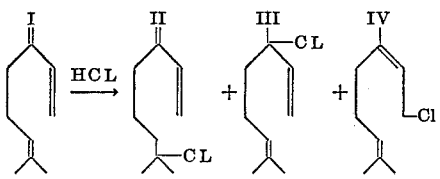

The proportion of myrcenyl chloride (II) can be minimised by carrying out the hydrohalogenation in the presence of a copper catalyst according to British Pat. 896,262 or British Pat. 953,200. The mixture of the allylic terpenic halides, that is linalyl chloride (III) and geranyl (neryl) chloride (IV), has then been subjected to solvolysis or displacement with acetate ion to produce linalyl acetate and geranyl acetate. Catalysts are employed for this reaction and these catalysts can affect the allylic transformation so that, for example, when the chloride is reacted with sodium acetate in the presence of an amine catalyst as described in British Pat. 979,523 the equilibrium is shifted to produce predominantly the geranyl and neryl acetates, whereas when the halide is solvolysed by acetic acid in the presence of a hydrogen chloride acceptor such as sodium acetate and a cuprous halide catalyst is employed as described in British Pat. 979,524 the product contains a greater proportion of the linalyl derivative. There is also always a tendency for some terpenic rearrangement to occur so that, for example, a-terpinyl chloride is formed from myrcene hydrochloride. This results in a-terpinyl esters and a-terpineol on saponification and, since a-terpineol is a relatively commonly available and cheap chemical in this field, its production is an economic loss.

On the other hand direct aqueous solvolysis of the halide compounds has hitherto been found to lead to a generally unacceptable degree of by-product formation. Such by-products may include hydrocarbons, ethers and cyclisation products such as a-terpineol. Moreover, where as in the case of myrcene hydrochloride, there is more than one possible isomeric product of hydrolysis the control of the ratio of the isomeric products is difficult.

It is seen therefore that the prior art processes for the production of geraniol and linalol are not entirely satisfactory and this is particularly so for linalol which being a tortiary alcohol is liable to suffer an elimination reaction leading to hydrocarbon by-products and which is not obtained in high yield even when the acetate is catalysed by cuprous chloride.

We have now discovered a process which permits the direct solvolysis of allylic terpenic halides to allylic terpenic alcohols. This involves solvolysis with water in the presence of a liquid compound in which the terpenic halide and water are separately miscible and the use of a cuprous halide catalyst. This process proceeds with preferential formation of the more substituted allylic isomer, i.e. a tertiary alcohol is formed in preference to a primary alcohol, etc. While not so limited, the process is particularly useful for the solvolysis of myrcene hydrohalide to produce linalol. The process is also remarkably rapid at low temperatures which enables concurrent terpenic rearrangements leading to unwanted by-products to be minimised.

Accordingly, the present invention provides a process for the production of a $C_{10}$ allylic terpenic alcohol which comprises reacting a $C_{10}$ allylic terpenic halide with an aqueous medium in the presence of an inert liquid compound in which the terpenic halide and water are each separately soluble and in the presence of a cuprous halide.

The said allylic terpenic halide is preferably a linalyl, geranyl or neryl halide, often a mixture thereof obtained by the monohydrohalogenation of myrcene or ocimene and herein termed myrcene hydrochloride. The product obtained from such a mixture according to the invention normally comprises linalol as the major component with smaller proportions of geraniol (nerol), α-terpineol (which results from terpenic rearrangement) and myrcenol (which results from the non-allylic myrcenyl halides present in the original myrcene hydrohalide). However, the invention may also be carried out on verbenyl chloride (resulting from allylic chlorination of α-pinene) to produce the tertiary alcohol 2-hydroxy-γ-pinene and its allylic isomer verbenol; carvyl chloride (resulting from allylic chlorination of limonene) to produce carveol; 2-chloro-6-p-methane (resulting from allylic chlorination of carvomenthene) to produce 2-hydroxy-6-p-menthene; 5-chloro-3-p-menthene (resulting from allylic chlorination of 3-p-menthene) to produce 5-hydroxy-3-p-menthene; 3-chloro-2,6-dimethyl-1,4,6-octatriene (resulting from allylic chlorination of allo-ocimene) to produce 3-hydroxy-2,5-dimethyl - 1,4,6 - octatriene; 6-chloro-8-hydroxy-1-p-menthene (resulting from allylic chlorination of α-terpineol) to produce 6,8-dihydroxy-1-p-menthene; 1-chloro-2-p-menthene and 4-chloro-2-p-menthene obtained as a mixture by monohydrohalogenation of α-terpinene to yield 1-hydroxy-2-p-menthene, 4-hydroxy-2-p-menthene and their allylic isomers piperitol and carvenol; 3-chloro-1,1,2,3-tetramethyl-4-cyclohexene (obtained by allylic chlorination of α- or β-pyronene) to yield 3-hydroxy-1,1,2,3-tetramethyl-4-cyclohexene and its allylic isomer 5-hydroxy - 1,1,2,3 - tetramethyl-3-cyclohexene; 3-chloro-2-methyl-6-methylene-1,7-octadiene (obtained by allylic chlorination of myrcene) to yield 3-chloro-2-methyl-6-methylene-1,7-octadiene and its allylic isomer 1-hydroxy-2-methyl-6-methylene-2,7-octadiene; and dihydromyrcene chloride (obtained by allylic chlorination of dihydromyrcene) to yield 3-hydroxy-1,6-dimethyl-1,7-octadiene and its allylic isomer 1-hydroxy-2,6-dimethyl-2,6-octadiene.

These allylic terpenic halides are substantially insoluble in water and the present invention requires the use of an inert solvent medium in which both the terpenic halide and water are each separately soluble. Such solvent is inert to the extent that it does not itself substantially solvolyse or otherwise react with the halide. However, the requirements for solubility of the terpenic halide and water in the said liquid compound do not mean that the reaction mixture is necessarily a one-phase system. It is found that provided the halide and water employed are each separately soluble in the solvent, satisfactory results are obtained. Thus a large excess of water can be employed if desired, though the water present in the reaction mixture need be no more than that stoichiometrically required to solvolyse the terpenic halide. The preferred inert liquid compound for present purposes is acetone, but for example dioxane, diethyl carbitol, tert.-butanol and sulpholane may also be employed. Such liquid should be present in an amount of at least half the weight of the terpenic chloride. An excess is no disadvantage except as regards the difficulty of operating in a more dilute reaction medium and it is preferred that the weight of the liquid compound is from 80 to 150 parts per 100 parts by weight of the terpenic chloride employed.

The reaction mixture comprises a cuprous halide, normally cuprous chloride, as catalyst. Surprisingly we find that preformed cuprous oxide is not effective for present purposes. The cuprous halide is normally present in an amount of from 2 to 15%, preferably 5 to 10%, by weight based on the weight of terpenic halide.

The pH of the aqueous phase of the reaction mixture is preferably maintained at pH 7 or above by the use of a buffer or mild base. We have found that the presence of sodium bicarbonate is very suitable for this purpose, but there can also be employed calcium or magnesium carbonate. More caustic alkalis are less suitable since best results are obtained when the reaction mixture has a pH of 7.5 to 9.0.

The present process is preferably carried out at a low temperature. Above 50° C. undue terpenic rearrangement is likely to occur and desirably the reaction is carried out at −30° C. to 20° C. The effect of acidity of the reaction mixture and the reaction temperature are interdependent and a low pH can more readily be tolerated at low temperatures. Thus if no hydrogen chloride acceptor is provided the reaction temperature should be below 0° C. if undue side reactions are to be avoided. The reaction mixture is stirred with external cooling and the solvolysis usually requires from 2 to 6 hours or even longer depending on the particular reactivity of the terpenic halide to be solvolysed. If the pH is controlled by the presence of a carbonate or bicarbonate the completion of the reaction is conveniently denoted by cessation of carbon dioxide evolution.

At the conclusion of the reaction, the catalyst is removed by filtration and the solvent by distillation or by water washing. The organic product is then purified in the normal manner, for example by fractional distillation under vacuum or on a chromatographic column. The product usually contains a mixture of isomeric allylic alcohols together with by-products resulting from terpenic rearrangements or from impurities present in the allylic terpenic halide. However, the more highly substituted of the isomeric allylic alcohols usually predominates and accordingly the present invention is particularly effective for producing linalol from myrcene hydrohalide.

The allylic terpenic alcohols produced according to the invention find use as such in perfumery or as intermediates for making other valuable perfumery ingredients.

The invention is illustrated by the following examples in which quantities are on a weight basis.

EXAMPLE 1

A mixture of crude myrcene hydrochloride (1000 parts), acetone (800 parts) water (1500 parts), sodium bicarbonate (540 parts) and cuprous chloride (50 parts) was stirred at 0° C. for 4 hours when the evolution of $CO_2$ ceased. The acetone was stripped by distillation and the mixture heated to 100° C. to complete the hydrolysis of the more stable α-terpinyl chloride until analysis showed the terpenic chloride content to be less than 0.5%. The oily layer was separated, washed with water and then fractionated under vacuum whereupon there was obtained linalol (480 parts), α-terpineol (120 parts) hydrocarbons (120 parts) and a residue (70 parts) remained.

EXAMPLE 2

The process of Example 1 was repeated except that the reaction mixture was stirred for 5 hours at 20° C. There were obtained: linalol (450 parts), α-terpineol (150 parts), hydrocarbons (150 parts) and a residue (74 parts).

EXAMPLE 3

Myrcene hydrochlorides (200 parts), water (300 parts) t-butanol (168 parts), sodium bicarbonate (108 parts) and cuprous chloride (10 parts) were stirred at room temperature for four hours. The residual terpenic chloride content was then found to be 16%, but after heating to 100° C. for four hours to remove the t-butanol, this chloride content was less than 0.1%. The residual oil layer was shown to contain

| | Percent |
|---|---|
| Linalol | 65 |
| α-Terpineol | 13 |
| Geraniol | 2 |
| Hydrocarbons | 15 |
| Residue | 5 |

EXAMPLE 4

Myrcene hydrochlorides (200 parts), water (40 parts), t-butanol (400 parts) and cuprous chloride (10 parts) were stirred at 18–20° C. for five hours during which time most of the allylic chlorides had reacted. Sodium bicarbonate solution was then slowly added to neutralise the free hydrogen chloride present and the whole mixture boiled for five hours after removal of the tertiary butanol. The residual oil phase was shown to consist of

| | Percent |
|---|---|
| Hydrocarbons | 20 |
| Linalol | 55 |
| a-Terpineol | 20 |
| Residue | 5 |

EXAMPLE 5

Repetition of Example 4 at 0° C. gave a considerably improved yield of linalol with corresponding reduction in the amounts of by-product hydrocarbon and α-terpineol.

It will be noted that in this and the proceeding examples no significant quantity of geraniol or nerol was obtained.

EXAMPLE 6

85.5 g. of carvyl chloride were added to solvolysis solution containing 80 g. acetone; 150 g. water; 54 g. sodium bicarbonate and 5 g. cuprous chloride. The mixture was stirred at 20° C. for 7 hours after which time it was found that 75% of the carvyl chloride had reacted. The remaining chloride was hydrolyzed by refluxing the mixture for 4 hours. The acetone was then distilled off at atmospheric pressure and the residue cooled and allowed to separate into an aqueous and an oil layer. The oil layer was removed and distilled at 1 mm. pressure through an 8 in. column packed with Fenski helices.

40 g. of a mixture of cis and trans carveols were obtained.

We claim:

1. The process for the production of $C_{10}$ allyl terpene mono alcohols comprising reacting a $C_{10}$ allylic mono-halo-terpene with water in a reaction mixture comprising (i) said halo-terpene, (ii) water, (iii) an inert liquid solvent, said inert liquid solvent being one in which said halo-terpene and water are each separately soluble, and (iv) a cuprous halide, said inert liquid solvent being present in said reaction mixture in an amount at least half the weight of said halo-terpene, and the said cuprous halide being present in said reaction mixture in an amount from 2% to 15% by weight based on the weight of said halo-terpene, said reaction mixture having a pH of from 7.5 to 9.0 and having a temperature of not above 50° C.

2. The process of claim 1 wherein said inert liquid solvent is selected from the group consisting of acetone, dioxane, diethyl carbitol, tert.-butanol, and sulpholane.

3. The process of claim 2 wherein said halo-terpene is selected from the group consisting of linalyl halides, geranyl halides, neryl halides and carvyl halides.

4. The process of claim 3 wherein said inert liquid solvent is present in an amount of from 80 to 150 parts by weight per 100 parts of said halo-terpene; and wherein said pH is maintained at from 7.5 to 9.0 by the use of a buffer or mild base.

5. The process of claim 4 wherein said temperature is from —30° C. to 20° C.

6. The process of claim 5 wherein said inert liquid solvent is acetone; wherein said cuprous halide is cuprous chloride; and wherein said cuprous chloride is present in said reaction mixture in an amount from 5% to 10% by weight based on the weight of said halo-terpene.

7. The process of claim 1 wherein said inert liquid solvent is acetone.

8. The process of claim 7 wherein said halo-terpene is selected from the group consisting of linalyl halides, geranyl halides, neryl halides, and carvyl halides; wherein said cuprous halide is cuprous chloride; wherein said cuprous chloride is present in said reaction mixture in an amount from 5% to 10% by weight based on the weight of said halo-terpene; and wherein said pH is maintained at from 7.5 to 9.0 by the use of a buffer or mild base.

9. The process of claim 8 wherein said temperature is from —30° C. to 20° C.; and wherein said inert liquid solvent is present in an amount of from 80 to 150 parts by weight per 100 parts of said halo-terpene.

10. The process of claim 9 wherein said halo-terpene is myrcene hydrochloride; and wherein said pH is maintained at from 7.5 to 9.0 by the addition to said reaction mixture of sodium bicarbonate.

11. The process of claim 1 wherein said inert liquid solvent is present in an amount of from 80 to 150 parts by weight per 100 parts of said halo-terpene; wherein said cuprous halide is present in said reaction mixture in an amount from 5% to 10% by weight based on the weight of said halo-terpene; and wherein said pH is maintained at from 7.5 to 9.0 by the use of a buffer or mild base.

12. The process of claim 11 wherein said halo-terpene is selected from the group consisting of linalyl halides, geranyl halides, neryl halides, and carvyl halides; wherein said terpenic halide is a chloride; wherein said inert liquid solvent is selected from the group consisting of acetone, dioxane, diethyl carbitol, tert.-butanol, and sulpholane; wherein said cuprous halide is cuprous chloride; wherein said temperature is from —30° C. to 20° C.; and wherein said pH is maintained at from 7.5 to 9.0 by the addition to said reaction mixture of sodium bicarbonate.

13. The process of claim 12 wherein said halo-terpene is myrcene hydrochloride.

14. The process of claim 1 wherein said halo-terpene is myrcene hydrochloride.

15. The process of claim 7 wherein said halo-terpene is myrcene hydrochloride.

References Cited

UNITED STATES PATENTS

| | | | |
|---|---|---|---|
| 2,323,781 | 7/1943 | Kohler | 260—640 |
| 2,475,364 | 7/1949 | Griendt et al. | 260—640 |
| 2,871,271 | 1/1959 | Booth | 260—640 |
| 2,995,600 | 8/1961 | Webb | 260—631.5 |
| 3,018,308 | 1/1962 | Levine et al. | 260—640 |
| 3,328,469 | 6/1967 | Spector et al. | 260—640 |

FOREIGN PATENTS

| | | | |
|---|---|---|---|
| 245,402 | 10/1962 | Australia | 260—640 |

LEON ZITVER, Primary Examiner

J. E. EVANS, Assistant Examiner

U.S. Cl. X.R.

260—640